(12) United States Patent
Lille

(10) Patent No.: US 7,861,400 B2
(45) Date of Patent: Jan. 4, 2011

(54) FABRICATING A WRITE HEAD WITH MULTIPLE ELECTRONIC LAPPING GUIDES

(75) Inventor: Jeffrey S. Lille, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 774 days.

(21) Appl. No.: 11/744,572

(22) Filed: May 4, 2007

(65) Prior Publication Data
US 2008/0273275 A1 Nov. 6, 2008

(51) Int. Cl.
*G11B 5/127* (2006.01)
*H04R 31/00* (2006.01)

(52) U.S. Cl. ............... 29/603.09; 29/603.13; 29/603.14; 29/603.16; 29/603.18; 360/121; 360/122; 360/317; 360/319; 451/5; 451/41

(58) Field of Classification Search . 29/603.12–603.16, 29/603.18; 360/211, 212, 317, 319; 451/5, 451/8, 10, 28, 36, 37, 41
See application file for complete search history.

(56) References Cited

U.S. PATENT DOCUMENTS

| | | | |
|---|---|---|---|
| 5,023,991 A | 6/1991 | Smith | |
| 5,361,547 A | 11/1994 | Church et al. | |
| 5,722,155 A | 3/1998 | Stover et al. | |
| 6,370,763 B1 | 4/2002 | Watanuki et al. | |
| 6,428,385 B1 | 8/2002 | Watanuki et al. | |
| 6,884,148 B1* | 4/2005 | Dovek et al. | 451/5 |
| 7,139,153 B2 | 11/2006 | Hsiao et al. | |
| 2002/0094758 A1 | 7/2002 | Reiley et al. | |
| 2003/0020467 A1 | 1/2003 | Kasahara et al. | |
| 2005/0070206 A1 | 3/2005 | Kasiraj et al. | |
| 2005/0185345 A1 | 8/2005 | Ding et al. | |
| 2008/0144215 A1* | 6/2008 | Hsiao et al. | 360/119.04 |

* cited by examiner

*Primary Examiner*—Paul D Kim
(74) *Attorney, Agent, or Firm*—Duft Bornsen & Fishman, LLP

(57) ABSTRACT

Write heads and corresponding methods of fabrication are provided using multiple electronic lapping guides to collect information regarding multiple distances of a write head, such as a throat height and a flare point distance of a write pole. A method of fabricating a write head includes fabricating a write pole and a corresponding write pole ELG. The method further includes fabricating a trailing shield and a corresponding trailing shield ELG. The method further includes performing a lapping process on the write head, and monitoring a lapping depth of the lapping process based on the resistance of the write pole ELG and the resistance of the trailing shield ELG.

10 Claims, 7 Drawing Sheets

FABRICATING A WRITE HEAD WITH MULTIPLE ELECTRONIC LAPPING GUIDES

BACKGROUND OF THE INVENTION

1. Field of the Invention

The invention is related to the field of magnetic disk drive systems and, in particular, to fabricating write heads with a write pole electronic lapping guide and a trailing shield electronic lapping guide.

2. Statement of the Problem

Magnetic disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

Write heads and other components of the recording heads are typically produced using thin-film deposition and patterning techniques. The several material layers which make up a write head for a magnetic recording head are typically formed by depositing full film materials of the write pole layers on a wafer substrate, depositing and patterning a masking layer over the write pole layers to form a mask structure, etching the exposed portion of the write pole layers around the mask structure, and then removing the mask structure. A trailing shield structure may then be formed around the write pole. The trailing shield is formed to prevent the write pole from writing to neighboring tracks during the writing process.

After the recording heads are formed, the recording heads are cut from the wafer into individual recording heads, or rows of recording heads. Sawing has been a typical method for separating wafers into individual recording heads. The surfaces of the recording heads that are exposed when the wafers are cut eventually form the air bearing surface (ABS) of the recording head.

A lapping process is used to form the ABS of a recording head, and more particularly, the ABS of the write head. To monitor progress of the lapping process, electronic lapping guides (ELGs) are often formed proximate to a write pole. FIG. 1 illustrates a prior art write pole portion of a write head 100 with an ELG 140. The write head 100 includes a write pole 110 and a yoke 120. The location where write pole 110 flares out to become yoke 120 is known as the flare point 125. A trailing shield 130 envelopes portions of write pole 110 (which are not visible in FIG. 1). A lapping process is used to lap trailing shield 130 and write pole 110 to form ABS 150. The lapping process is performed from the bottom up in FIG. 1.

A resistance of ELG 140 is used to measure a throat height 165, which is the distance between ABS 150 and a back edge 132 of trailing shield 130. A back edge 142 of ELG 140 is aligned with back edge 132 of trailing shield 130. Current is applied to ELG 140 to measure the resistance of ELG 140. As portions of ELG 140 are lapped away, the resistance of ELG 140 increases. The resistance of ELG 140 correlates with the height of ELG 140, which correlates with throat height 165 of write pole 110. Once the desired throat height 165 is reached, the lapping process is stopped and ABS 150 is completed.

Due to the large density of data recording on magnetic recording devices, it is very important that write heads are fabricated within desired specifications. It is important that a write head 100 have not only a specific throat height 165, but also a specific flare point distance 160. Flare point distance 160 is the distance between ABS 150 and flare point 125. However, present ELGs do not provide a measurement of flare point distance 160, and thus, flare point distance 160 may only be estimated using optical processes, or time consuming TEM metrology.

Further, present ELGs do not provide the ability to gather information from more than one layer of a write head. For instance, if ELG 140 is comprised of a material similar to write pole 110, then measurement equipment attached to ELG 140 gathers information regarding write pole 110, but does not gather precise information regarding trailing shield 130, which is a different layer of material. Thus, it is evident from the above discussion that improved solutions are needed for monitoring a lapping process of an ABS of a write head.

SUMMARY OF THE SOLUTION

The invention solves the above and other related problems with write heads having a write pole ELG and a trailing shield ELG that provide information regarding multiple distances of a write head. The multiple lapping guides may provide information regarding both a throat height and a flare point distance of a write pole of a write head. Advantageously, a write head may be lapped to a desired throat height, and at the same time, the flare point distance of the write head may be determined. Thus, if the flare point distance is out of specification for the write head, then the write head may be discarded, or a modified lapping operation may be performed.

One exemplary embodiment of the invention comprises a method of fabricating a write head. The method comprises fabricating a write pole and a corresponding write pole ELG. A back edge of the write pole ELG may be substantially aligned with a flare point of the write pole. The method further comprises fabricating a trailing shield and a corresponding trailing shield ELG. A back edge of the trailing shield ELG may be substantially aligned with a back edge of the trailing shield. The method further comprises performing a lapping process on the write head, and monitoring a lapping depth of the lapping process based on the resistance of the write pole ELG and the resistance of the trailing shield ELG.

Another exemplary embodiment of the invention comprises a write head of a magnetic recording head. The write head comprises a write pole, and a write pole ELG proximate to the write pole. A back edge of the write pole ELG is substantially aligned with a flare point of the write pole. The write head further comprises a trailing shield proximate to the write pole, and a trailing shield ELG proximate to the trailing shield. A back edge of the trailing shield ELG is substantially aligned with a back edge of the trailing shield. The write pole ELG and the trailing shield ELG may be used during a lapping process to monitor the progress of the lapping process.

Another exemplary embodiment of the invention comprises a magnetic recording head. The magnetic recording head comprises a write pole and at least two ELGs. The magnetic recording head further comprises a first electrical lead connected to the two ELGs, a common electrical lead connected to the two ELGs and a non-sensor device on the read/write head, and a second electrical lead that is connected to the non-sensor device.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 2-12 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
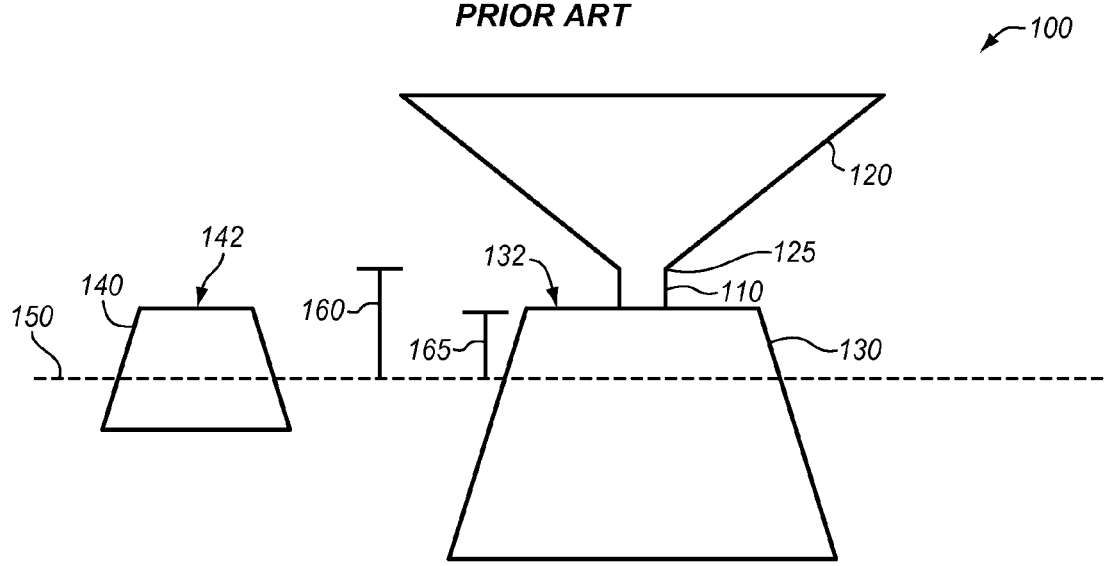
FIG. 1 illustrates a prior art write head with an ELG.
Figure 2:
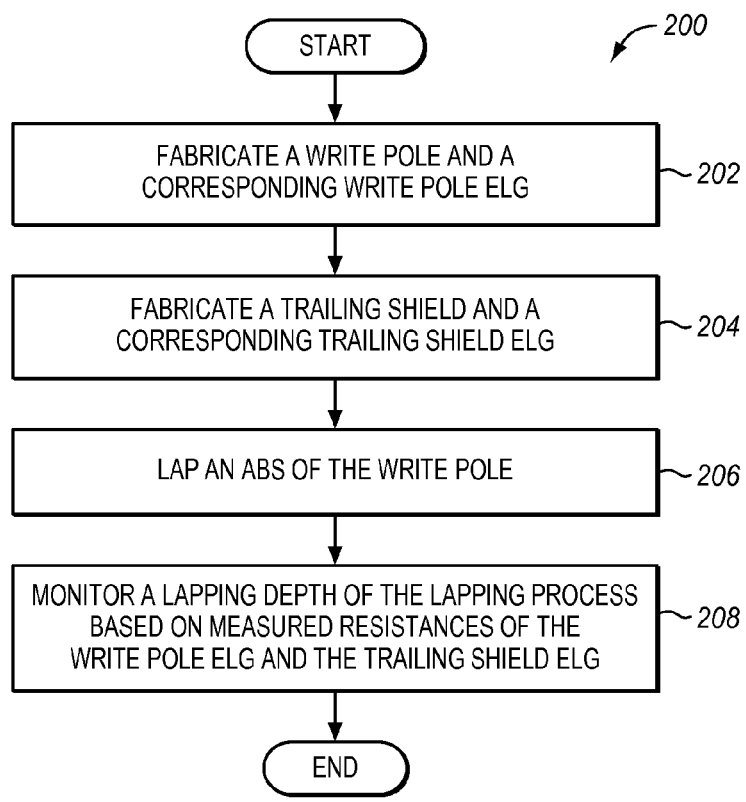
FIG. 2 illustrates a method for fabricating a write head in an exemplary embodiment of the invention.

FIG. 2 illustrates a method 200 for fabricating a write head in an exemplary embodiment of the invention. Method 200 will be described in reference to write head 300, illustrated in FIGS. 3-6. The steps of method 200 are not all-inclusive, and may include other steps not shown for the sake of brevity.

Figure 3:
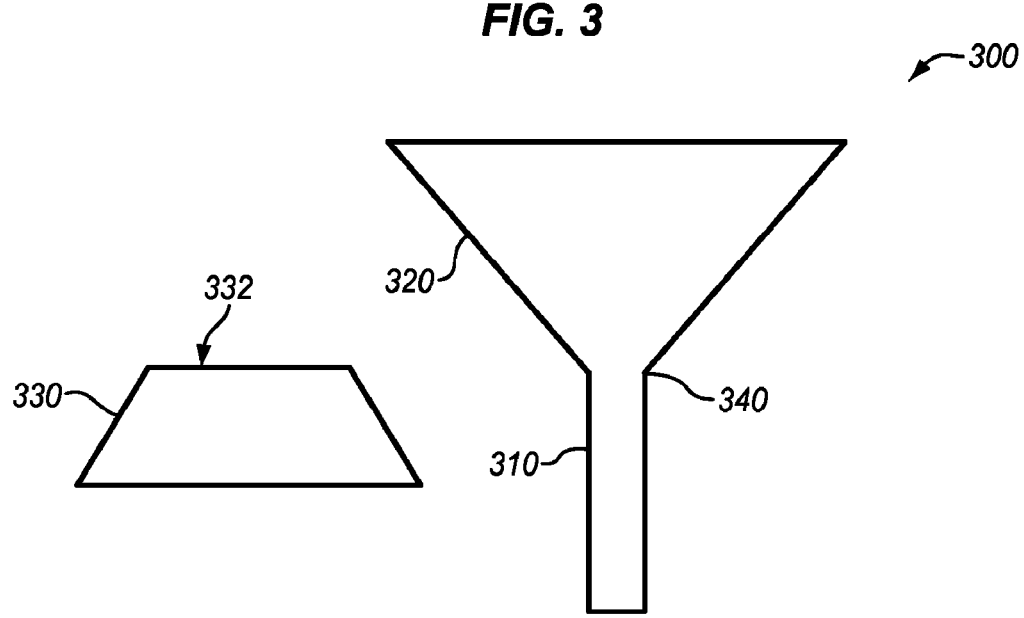
FIG. 3 illustrates a top view of a write head in an exemplary embodiment of the invention.

In step 202, a write pole 310 (see FIG. 3) and a corresponding write pole ELG 330 of write head 300 are fabricated. FIG. 3 illustrates a top view of write head 300. Referring to FIG. 3, write pole 310 also includes a yoke 320 portion coupled to write pole 310. To correspond to write pole 310, a back edge 332 of write pole ELG 330 may be aligned with a flare point 340 of write pole 310.

Write pole 310, yoke 320 and write pole ELG 330 may be fabricated at the same time using thin-film deposition techniques. Those of ordinary skill in the art will readily recognize a variety of techniques for fabricating write pole 310, yoke 320 and write pole ELG 330. For example, a thin film of magnetic material comprising write pole 310, yoke 320 and write pole ELG 330 may be fabricated atop a wafer substrate, a seed layer, a layer of non-magnetic material, etc. The magnetic material may comprise NiFe, a CoFe alloy, a laminate of magnetic and non-magnetic materials, etc. Thus, write pole 310 and write pole ELG 330 may comprise substantially the same material. However, for electrical resistance reasons, it may be preferred that write pole ELG 330 comprise a different material that is more conductive than $Co_{40}Fe_{60}$ or $Ni_{45}Fe_{55}$. This can be done with a separate processing step to put the higher conductivity material at the location of write pole ELG 330.

A full film of photo-resistive material may then be fabricated atop the magnetic material. The photo-resistive layer may be etched using a photolithographic process to form a hard mask structure. The hard mask structure is left above areas of material to be retained (e.g., write pole 310, yoke 320 and write pole ELG 330). The hard mask structure is used as a mask to RIE to remove material not protected by the hard mask structure. After the RIE process, write pole 310, yoke 320 and write pole ELG 330 will remain on the wafer. The hard mask structure may then be removed through an etching process, which results in write head 300 illustrated in FIG. 3. The wafer may then be refilled with a non-magnetic material such as SiOx or AlOx. Those of ordinary skill in the art will recognize that other desired layers and structures may be fabricated during the exemplary process described above. Optionally, multiple write pole ELGs 330 may be fabricated proximate to write pole 310. For example, two write pole ELGs 330 may be fabricated on opposite sides of write pole 310. Further, a back edge 332 of each write pole ELG 330 may be substantially aligned with flare point 340.

Figure 4:
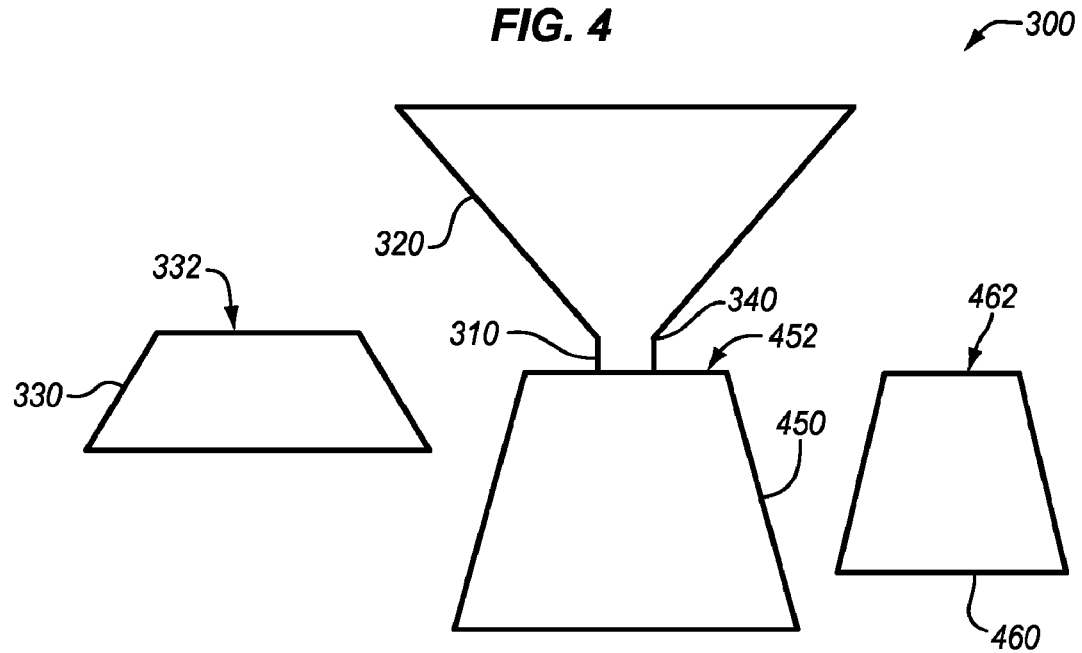
FIG. 4 illustrates a top view of a write head after the formation of a trailing shield in an exemplary embodiment of the invention.

In step 204, a trailing shield 450 is fabricated proximate to write pole 310. Trailing shield 450 may envelope a portion of write pole 310. Further, trailing shield 450 may be fabricated above write pole 310, or may be fabricated above other layers, such as insulation, which are coupled to write pole 310. A corresponding trailing shield ELG 460 is also formed proximate to trailing shield 450. FIG. 4 illustrates a top view of write head 300 after the formation of trailing shield 450. To correspond to trailing shield ELG 460, a back edge 452 of trailing shield 450 may be substantially aligned with a back edge 462 of trailing shield ELG 460. Trailing shield 450 and trailing shield ELG 460 may be fabricated at the same time, and comprise substantially the same material. Further, trailing shield 450 and trailing shield ELG 460 may be fabricated in a substantially similar thin film deposition process as used for fabricating write pole 310.

Figure 5:
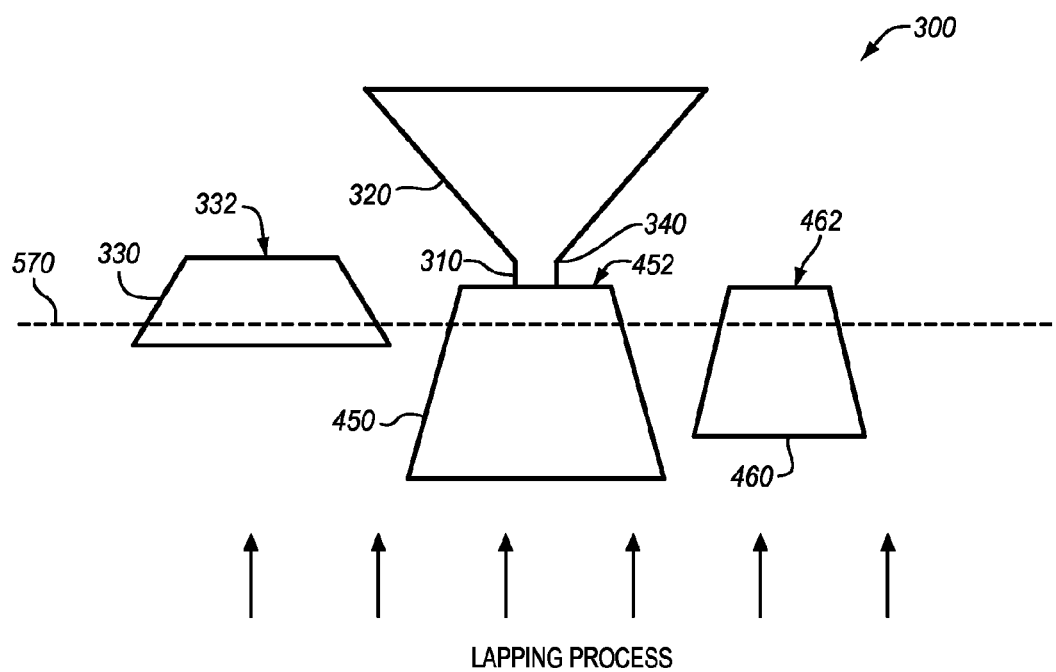
FIG. 5 illustrates a top view of a write head at the beginning of a lapping process in an exemplary embodiment of the invention.

FIG. 5 illustrates a top view of write head 300 at the beginning of the lapping process in an exemplary embodiment of the invention. In step 206, a lapping process is performed on write head 300 to form ABS 570 (see FIG. 5) of write head 300. For example, the lapping process may be performed to an edge of trailing shield 450. In step 208, a lapping depth of the lapping process of step 206 is monitored based on measured resistances of write pole ELG 330 and trailing shield ELG 460. When the lapping process reaches a desired lapping depth, then ABS 570 is formed, and the lapping process is complete. At this point, write head 300 has a desired throat height, and the lapping process of step 206 is complete.

To monitor the lapping process, current is applied to write pole ELG 330 and to trailing shield ELG 460 to measure the resistances of write pole ELG 330 and trailing shield ELG 460. As portions of write pole ELG 330 and trailing shield ELG 460 are lapped away, the resistances of write pole ELG 330 and trailing shield ELG 460 increase. The resistance of write pole ELG 330 may be correlated to the flare point distance of write pole 310. The resistance of trailing shield ELG 460 may be correlated with the throat height of write pole 310.

Alternatively, a single ELG may be used to monitor multiple distances of write pole 310. For example, either of trailing shield ELG 460 or write pole ELG 330 may comprise multiple layers of metal, with a back edge of a first layer of metal being colinear with a back edge of the flare point of write pole 310. A second layer of metal may have a back edge that is colinear with a back edge of the desired throat height of write pole 310, and measured resistances of the multiple layers of metal may be used to determine the throat height and flare point distance of write pole 310.

Figure 6:
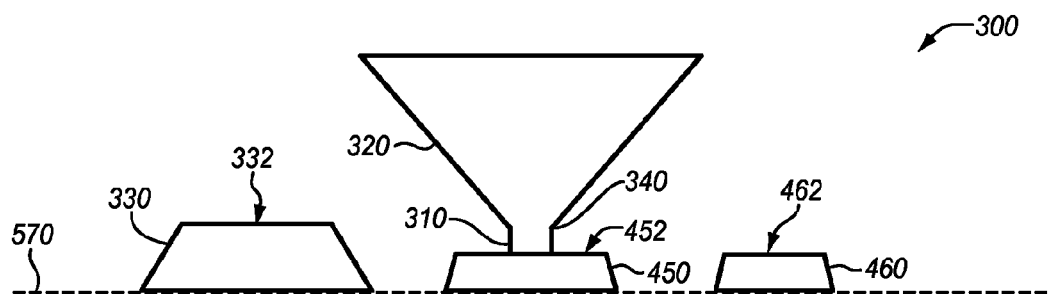
FIG. 6 illustrates a top view of a write head after a lapping process is complete in an exemplary embodiment of the invention.

Measurements of the resistance of trailing shield ELG 460 may be taken until a desired resistance or range of resistances of trailing shield ELG 460 is reached. The desired resistance or range of resistances correlate to a desired throat height of write pole 310. Once the desired resistance range is reached, the lapping process is complete. Likewise, measurements of the resistance of write pole ELG 330 may be taken simultaneously with the measurements of trailing shield ELG 460 to determine whether the measured resistance of write pole ELG 330 is a desired resistance or within a desired range of resistances. The desired resistance or desired range of resistances correlate to a desired flare point distance of the write pole. If the measured resistance does not correlate to the desired resistance or desired range of resistances, then write head 300 may not be within desired specifications, and additional lapping may be performed, a modified lapping processing may be performed, or write head 300 may be discarded. FIG. 6 illustrates a top view of write head 300 after the lapping process is complete. Note, the electrical leads for this write head are not shown.

Figure 7:
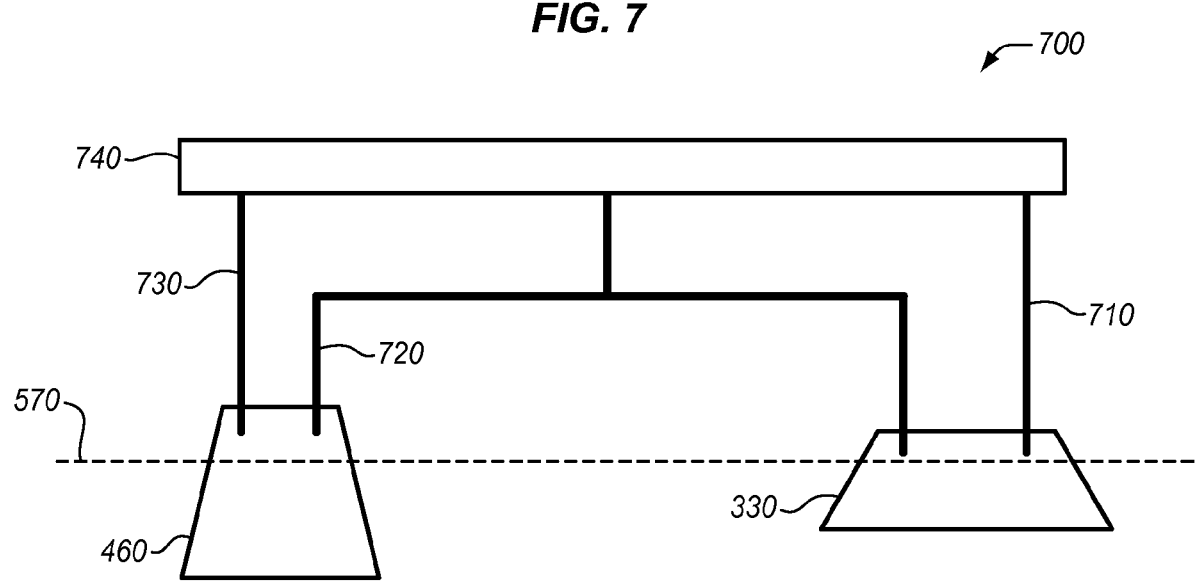
FIG. 7 illustrates a circuit with three leads for connecting a write pole ELG and a trailing shield ELG to lapping monitoring equipment in an exemplary embodiment of the invention.

Write pole ELG 330 and trailing shield ELG 460 may be electrically connected to lapping monitoring equipment in various configurations to reduce the number of pads needed to collect information regarding the lapping process. FIG. 7 illustrates a circuit 700 with three leads for connecting write pole ELG 330 and trailing shield ELG 460 to lapping monitoring equipment in an exemplary embodiment of the invention.

A first lead 710 connects lapping monitoring equipment 740 to write pole ELG 330. A second lead 730 connects lapping monitoring equipment 740 to trailing shield ELG 460. A common lead 720 connects lapping monitoring equipment 740 to trailing shield ELG 460 and write pole ELG 330. First lead 710, second lead 730 and common lead 720 may be electrically connected to lapping monitoring equipment 740 in either a parallel or serial configuration. Further, first lead 710, second lead 730, and common lead 720 may be connected to pads of write head 300, such as a W+ pad, a W− pad, a R+ pad or a R− pad, which further connect to lapping monitoring equipment 740.

In one embodiment, lapping monitoring equipment 740 may determine a resistance of write pole ELG 330 across first lead 710 and common lead 720. Likewise, lapping monitoring equipment 740 may determine a resistance of trailing shield ELG 460 across common lead 720 and second lead 730. Current is applied to first lead 710 and second lead 730, and a measurement is taken at common lead 720 to determine the resistances of trailing shield ELG 460 and write pole ELG 330. Known techniques may be applied to these resistance measurements to determine a throat height and flare point distance of write pole 310. Back edge 332 of write pole ELG 330 and back edge 462 of trailing shield ELG 460 may be aligned with other structures of write head 300 to determine different desired distances of write head 300.

More generally, one common lead 720 could be connected to a third or fourth device in order to conserve pads on the write head or a row of write heads. Similarly, a common lead 720 could be connected to one write pole ELG 330 and another device such as an inductive coil heater, sensor or sensor ELG. One may also want to use common lead 720 connected to trailing shield ELG 460 to connect to another device, such as an inductive coil, heater, sensor, or sensor ELG.

Figure 8:
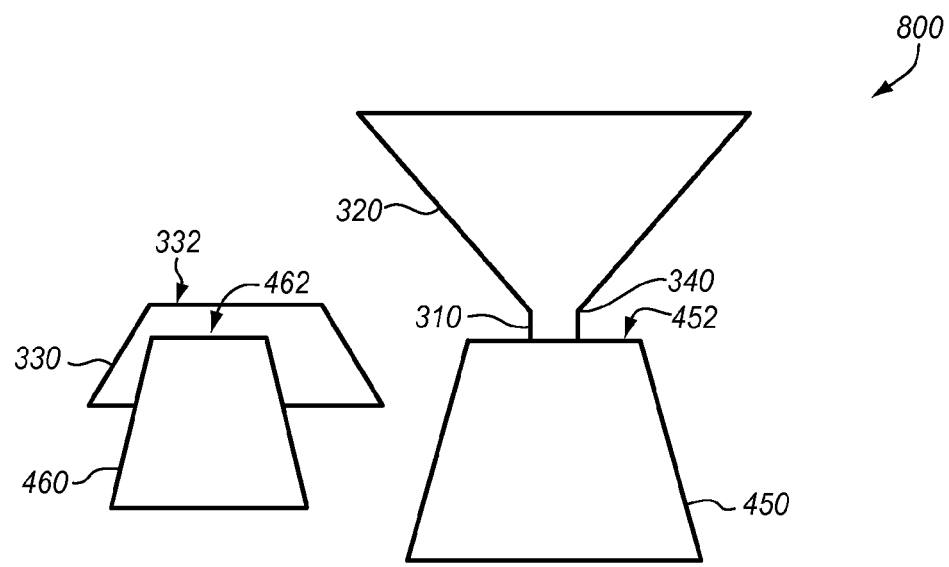
FIG. 8 illustrates a top view of a write head in which a trailing shield ELG is fabricated stacked atop a write pole ELG in an exemplary embodiment of the invention.

The embodiments described above illustrate a write head with a trailing shield ELG 460 on one side of a write pole 310, and a write pole ELG 330 on an opposite side of write pole 310. However, both trailing shield ELG 460 and write pole ELG 330 may be fabricated side by side on a single side of write pole 360. Further, trailing shield ELG 460 may be fabricated stacked atop write pole ELG 330. FIG. 8 illustrates a top view of a write head 800 in which trailing shield ELG 460 is fabricated stacked atop write pole ELG 330 in an exemplary embodiment of the invention. Those of ordinary skill in the art will readily recognize that other layers, such as insulation, may exist between trailing shield ELG 460 and write pole ELG 330.

Figure 9:
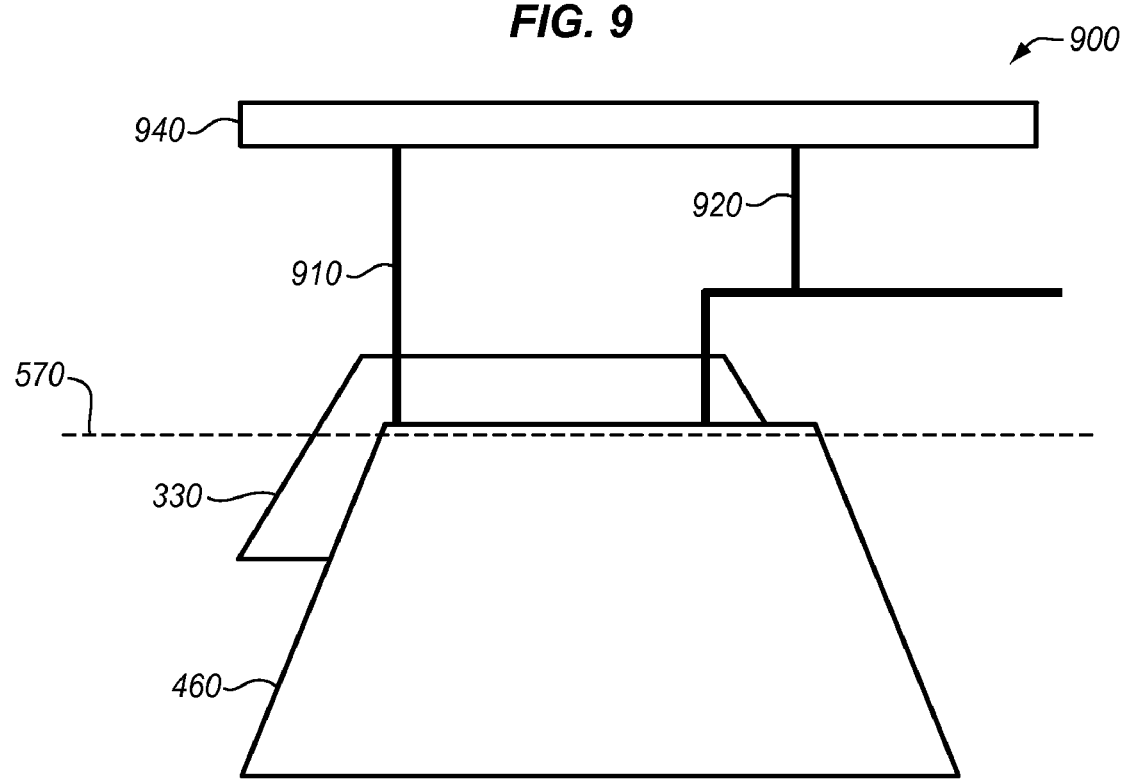
FIG. 9 illustrates a circuit with two leads for connecting a write pole ELG and a trailing shield ELG to lapping monitoring equipment in an exemplary embodiment of the invention.

FIG. 9 illustrates a circuit 900 with two leads for connecting write pole ELG 330 and trailing shield ELG 460 to lapping monitoring equipment in an exemplary embodiment of the invention. A common lead 910 connects lapping monitoring equipment 940 to trailing shield ELG 460 and write pole ELG 330. A second lead 920 connects lapping monitoring equipment 940 to write pole ELG 330. Current is applied to common lead 910. If no insulation is present between write pole ELG 330 and trailing shield ELG 460, then a resistance across common lead 910 and second lead 920 will provide a combined resistance of write pole ELG 330 and trailing shield ELG 460 to determine the flare point distance and the throat height of write pole 310.

If trailing shield ELG 460 or write pole ELG 330 is completely lapped away, then a spike in the resistance will occur, providing information that the desired throat height has been reached. The resistance measured across write pole ELG 330 will provide information regarding the flare point distance of write pole 310.

Figure 10:
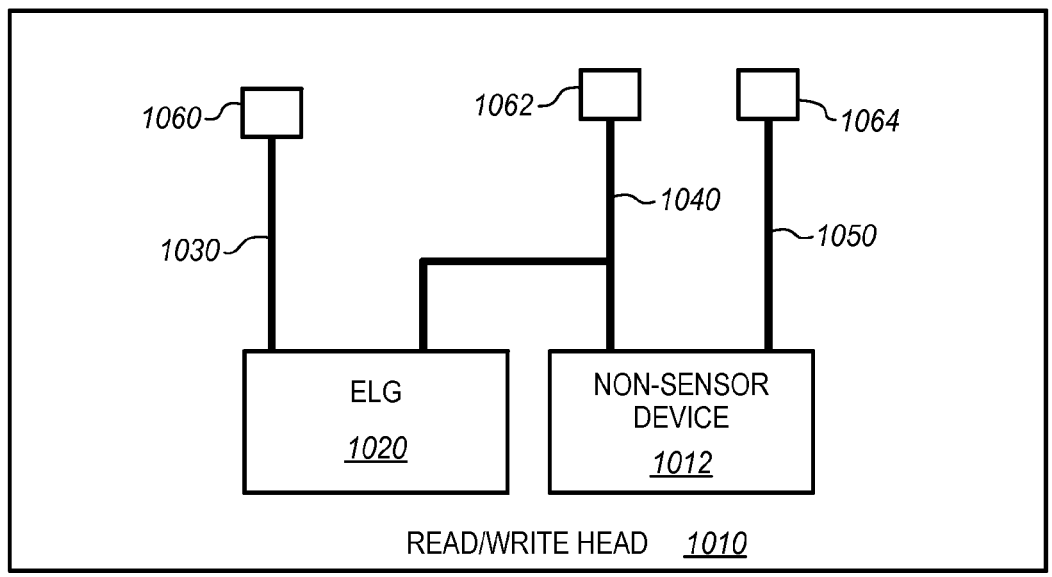
FIG. 10 illustrates a circuit diagram of a magnetic recording head for connecting an ELG and a non-sensor device in an exemplary embodiment of the invention.
Figure 11:
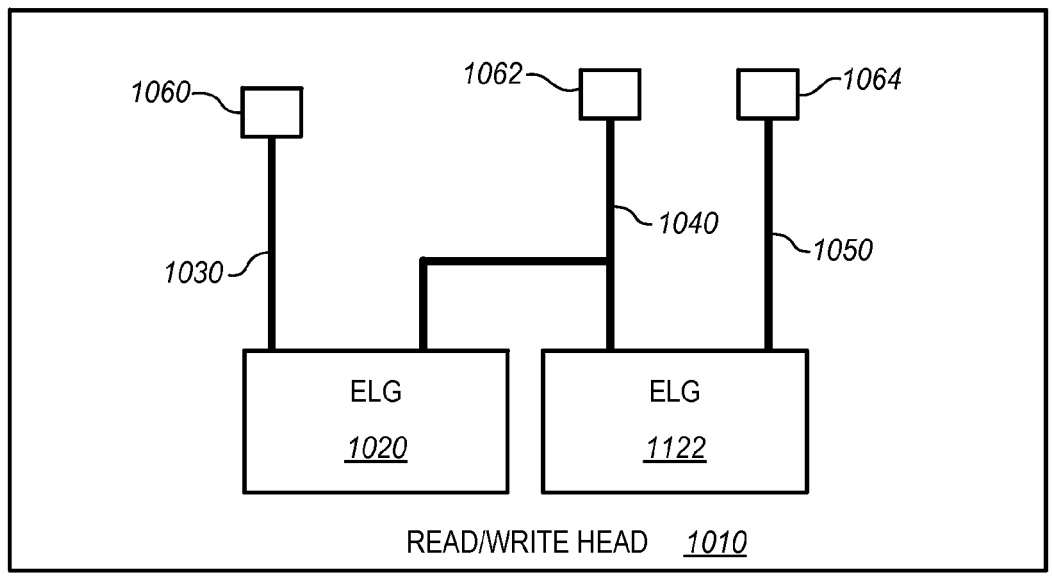
FIG. 11 illustrates another circuit diagram of a magnetic recording head for connecting two ELGs in an exemplary embodiment of the invention.

FIG. 10 illustrates a circuit diagram of a magnetic recording head 1000 for connecting at least one ELG and a non-sensor device in an exemplary embodiment of the invention. Magnetic recording head 1000 comprises a read/write head 1010. Read/write head 1010 may include a non-sensor device 1012, such as a heater. Magnetic recording head 1000 further comprises ELG 1020, where ELG 1020 may be any type of ELG, such as write pole ELG 330 and trailing shield ELG 460 described above. If ELG 1020 is a read sensor ELG, then a back edge of ELG 1020 may be substantially aligned with an edge of a read sensor of magnetic recording head 1000.

Magnetic recording head 1000 further comprises a first electrical lead 1030 connected to ELG 1020. First electrical lead 1030 may be connected to a pad 1060 of magnetic recording head 1000. Magnetic recording head 1000 further comprises a common electrical lead 1040 connected to ELG 1020, and non-sensor device 1012. Common electrical lead 1040 may be connected to a pad 1062 of magnetic recording head 1000. A third electrical lead 1050 connects a non-sensor device 1012 to pad 1064. Thus, the three leads allow ELG 1020 and non-sensor device 1012 to connect to three pads of magnetic recording head 1000, simplifying the overall connections of magnetic recording head 1000. ELG 1020 may be used to monitor a lapping depth of a lapping process performed on magnetic recording head 1000 as described above. Furthermore, the non-sensor device 1012 may be substituted with a second ELG 1122 as shown by magnetic recording head 1100 of FIG. 11. Other devices on the read/write head 1010 and their associated connections are not shown.

Figure 12:
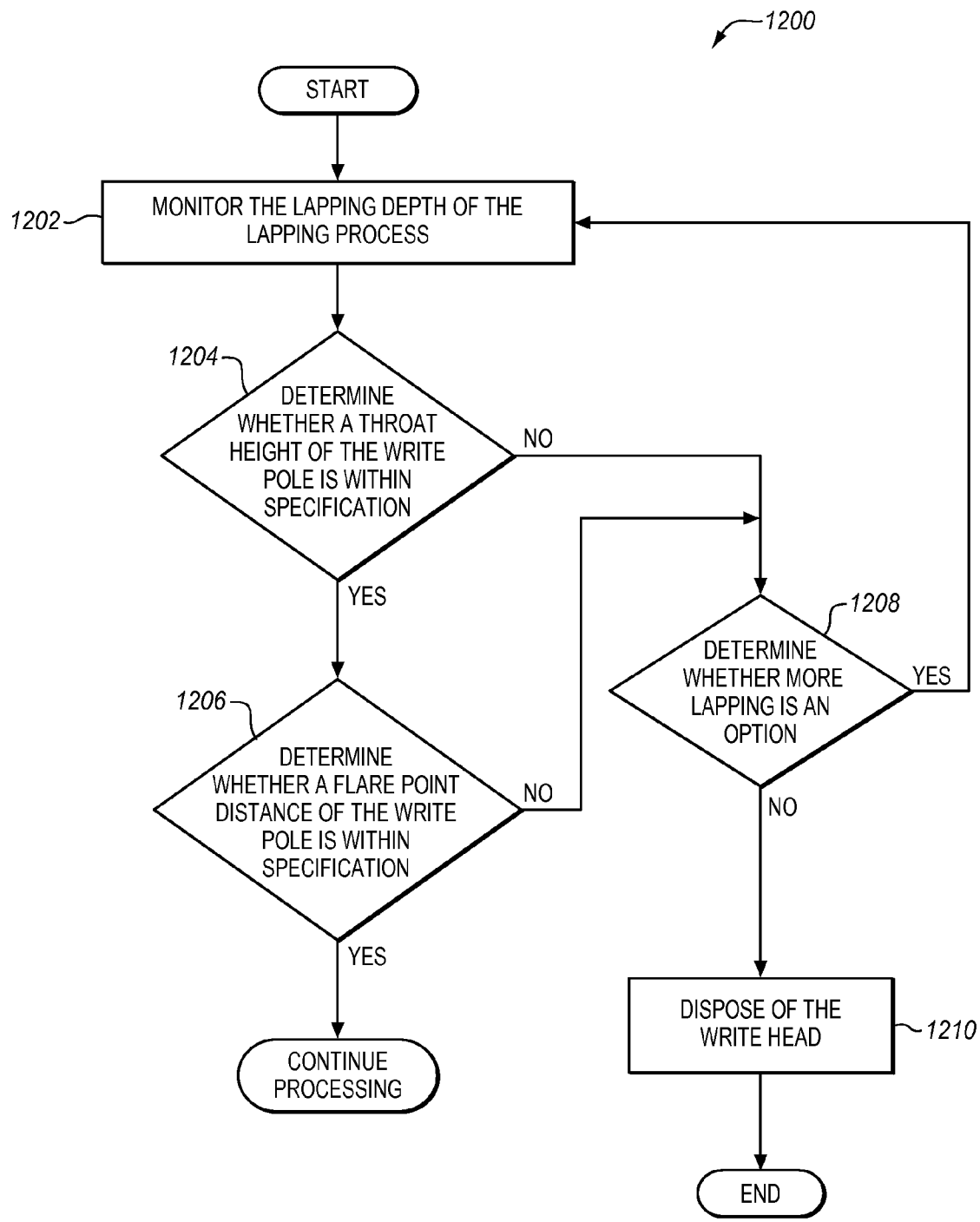
FIG. 12 is a flow chart of a method for determining whether a write head is within desired specifications in an exemplary embodiment of the invention.

The measurements taken by circuits 700 and 900, as well as measurement by magnetic recording heads 1000 or 1100 may be used to determine whether a write head is within desired specifications. For example, a manufacturer may want to determine that a write head has both a desired flare point distance and a desired throat height. FIG. 12 is a flow chart of a method 1200 for determining whether a write head 300 is within a desired specification in an exemplary embodiment of the invention. Method 1200 will be discussed in regard to write head 300 illustrated in FIGS. 3-6, and in regard to circuits 700 or 900 of FIGS. 7 and 9. The steps of method 1200 may not be all-inclusive, and may include other steps not shown for the sake of brevity.

In step 1202, the progress of the lapping process of step 206 is monitored using measured resistances of write pole ELG 330 and trailing shield ELG 460. The resistances of write pole ELG 330 and trailing shield ELG 460 may be monitored by either of circuits 700 or 900, or any other circuit configuration of write pole ELG 330, trailing shield ELG 460 and other ELGs.

In step 1204, a determination is made regarding whether a throat height of write pole 310 is within desired specifications. If the throat height is not within desired specifications, then processing continues in step 1208. Otherwise, if the throat height is within the desired specifications, then write head 300 is ready for fabrication of additional components or for installation in a magnetic recording device.

In step 1208, a determination is made regarding whether a flare point distance of write pole 310 is within desired specifications. If the flare point distance is not within the desired specifications, then a determination may be made in step 1206 to determine whether more lapping is an option. If more lapping is an option, then processing loops back to step 1202. Otherwise, if more lapping is not an option, then write head 300 may be disposed of in step 1210. Otherwise, write head 300 is ready for fabrication of additional components or for installation in a magnetic recording device.

Those of ordinary in the art will recognize that a write head is fabricated as one component of a recording head. Thus, while the embodiments described herein refer to fabrication of a write head, they may refer more generally to fabrication of a magnetic recording head, where a write head is fabricated as part of a larger structure including other components, such as a read sensor. Further, the ELGs described herein may be used in conjunction with additional ELGs, such as read sensor ELGs, to monitor lapping processes.

Although specific embodiments were described herein, the scope of the invention is not limited to those specific embodiments. The scope of the invention is defined by the following claims and any equivalents thereof.

I claim:

1. A method of fabricating a write head, the method comprising:
    fabricating a write pole and a corresponding write pole electronic lapping guide (ELG);
    fabricating a trailing shield and a corresponding trailing shield ELG;
    performing a lapping process on write pole, the write pole ELG, the trailing shield, and the trailing shield ELG of the write head; and
    monitoring a lapping depth of the lapping process based on a resistance of the write pole ELG and a resistance of the trailing shield ELG.

2. The method of claim 1, wherein a back edge of the write pole ELG is substantially aligned with a flare point of the write pole.

3. The method of claim 1, wherein a back edge of the trailing shield ELG is substantially aligned with a back edge of the trailing shield.

4. The method of claim 1, wherein the write pole ELG is fabricated atop the trailing shield ELG.

5. The method of claim 1, wherein the trailing shield ELG comprises substantially the same material as the trailing shield.

6. The method of claim 1 further comprising:
    measuring the resistance of the write pole ELG to determine a flare point distance of the write pole; and
    measuring the resistance of the trailing shield ELG to determine a throat height of the write pole.

7. The method of claim 6, further comprising:
    determining whether the write head is within desired specifications based on the measured flare point distance and the measured throat height.

8. The method of claim 1, further comprising:
    connecting a first lead to the write pole ELG and to lapping monitoring equipment;
    connecting a second lead to the write pole ELG and to the lapping monitoring equipment;
    connecting a common lead to the write pole ELG, to the trailing shield ELG, and to the lapping monitoring equipment, and wherein monitoring the lapping depth further comprises:
    monitoring the lapping depth using signals provided by the first lead, the second lead and the common lead.

9. The method of claim 1, wherein monitoring the lapping depth further comprises:
    measuring the resistance of the write pole ELG; and
    determining a flare point distance of the write pole and a throat height distance of the write pole from the resistance of the write pole ELG.

10. The method of claim 1, wherein monitoring the lapping depth further comprises:
    measuring the resistance of the trailing shield ELG; and
    determining a flare point distance of the write pole and a throat height distance of the write pole from the resistance of the trailing shield ELG.

* * * * *